(12) United States Patent
Francis et al.

(10) Patent No.: US 10,077,811 B2
(45) Date of Patent: Sep. 18, 2018

(54) TRANSFER CASE WITH DISCONNECT LUBRICATION

(71) Applicant: BorgWarner Inc., Auburn Hills, MI (US)

(72) Inventors: Philip J. Francis, Lapeer, MI (US); William C. Dodge, Saline, MI (US)

(73) Assignee: BorgWarner Inc., Auburn Hills, MI (US)

( * ) Notice: Subject to any disclaimer, the term of this patent is extended or adjusted under 35 U.S.C. 154(b) by 51 days.

(21) Appl. No.: 15/204,088

(22) Filed: Jul. 7, 2016

(65) Prior Publication Data

US 2018/0010650 A1 Jan. 11, 2018

(51) Int. Cl.
*F16D 25/12* (2006.01)
*B60K 17/344* (2006.01)
*F16D 13/52* (2006.01)
*F16D 13/74* (2006.01)

(52) U.S. Cl.
CPC .......... *F16D 25/123* (2013.01); *B60K 17/344* (2013.01); *F16D 13/52* (2013.01); *F16D 13/74* (2013.01)

(58) Field of Classification Search
None
See application file for complete search history.

(56) References Cited

U.S. PATENT DOCUMENTS

| 8,123,016 B2 | 2/2012 | Lundstrom | |
| 8,708,123 B2 | 4/2014 | Nilsson et al. | |
| 9,568,091 B2 * | 2/2017 | Drill | F16H 57/0457 |
| 2002/0079180 A1 * | 6/2002 | Mohan | F16D 25/0638 192/35 |
| 2005/0167223 A1 * | 8/2005 | Puiu | B60K 17/344 192/35 |
| 2010/0122887 A1 * | 5/2010 | Pritchard | F16D 25/0638 192/70.12 |
| 2015/0060228 A1 * | 3/2015 | Francis | F16H 57/0473 192/113.5 |
| 2017/0089402 A1 * | 3/2017 | Deakin | F16D 25/14 |
| 2017/0299046 A1 * | 10/2017 | Reth | F16H 57/0423 |

* cited by examiner

*Primary Examiner* — Jacob S. Scott
*Assistant Examiner* — Timothy Hannon
(74) *Attorney, Agent, or Firm* — Young Basile Hanlon & MacFarlane, P.C.

(57) ABSTRACT

A lubrication system (400) for a transfer case (200) includes a pump (228) selectively supplying a working fluid to a fluid reservoir of an actuator (226) configured to apply force to a clutch assembly (214) to cause the clutch assembly (214) to move between a disengaged position and an engaged position. The lubrication system also includes a relief valve (302) having a relief valve inlet fluidly coupled to the fluid reservoir of the actuator (226) which opens to receive the working fluid based on a threshold pressure level of the working fluid in the fluid reservoir. The lubrication system also includes a trough (306) fluidly coupled to a relief valve outlet of the relief valve (302). The trough (306) carries the working fluid from the relief valve outlet to a bearing assembly (227) associated with at least one of an input shaft (204) and a primary output shaft (206) of the transfer case (200) when the clutch assembly (214) is in the disengaged position.

17 Claims, 4 Drawing Sheets

TRANSFER CASE WITH DISCONNECT LUBRICATION

CROSS-REFERENCE TO RELATED APPLICATIONS

Not applicable.

BACKGROUND

In the field of vehicle drivetrain components, a transfer case is an apparatus that distributes driving power to more than one driven axle of the vehicle. A typical transfer case receives driving power from the transmission of the vehicle and transfers that power to a primary output shaft that is driven constantly, for example, during operation of the vehicle in a two-wheel drive mode, and a secondary output shaft that is driven selectively using a clutch, for example, during operation of the vehicle in a four-wheel drive mode.

To increase fuel efficiency of a vehicle drivetrain during two-wheel drive mode, rotation of a sprocket and chain that connect the primary output shaft and the secondary output shaft can be stopped, that is, the rotational dependency can be disconnected in a disconnect mode. However, stopping rotation of the chain can impact lubrication of some components in the transfer case. For example, the clutch assembly, the bearing assembly, and the seals typically receive lubrication as a result of rotation of the chain through a fluid reservoir or sump within the transfer case. Another source of lubrication must be provided in order to stop rotation of the chain to increase fuel efficiency in disconnect mode.

SUMMARY

According to an exemplary embodiment, a lubrication system for a transfer case includes a pump configured to selectively supply a working fluid to a fluid reservoir of an actuator. The actuator is configured to apply force to a clutch assembly to cause the clutch assembly to move between a disengaged position and an engaged position. The lubrication system for the transfer case also includes a relief valve having a relief valve inlet fluidly coupled to the fluid reservoir of the actuator. The relief valve inlet opens to receive the working fluid based on a threshold pressure level of the working fluid in the fluid reservoir. The lubrication system for the transfer case also includes a trough fluidly coupled to a relief valve outlet of the relief valve. The trough is configured to carry the working fluid from the relief valve outlet to a bearing assembly associated with at least one of an input shaft and a primary output shaft of the transfer case when the clutch assembly is in the disengaged position.

According to another exemplary embodiment, a transfer case includes a housing; an input shaft extending through the housing; a primary output shaft extending through the housing; a secondary output shaft extending through the housing; a clutch assembly having an engaged position in which the primary output shaft is coupled to the secondary output shaft to transfer torque therebetween and a disengaged position in which the primary output shaft is not coupled to the secondary output shaft; and a pump. The pump is configured to selectively supply a working fluid to a fluid reservoir of an actuator. The actuator is configured to apply force to the clutch assembly to cause the clutch assembly to move between the disengaged position and the engaged position. The pump is also configured to selectively supply the working fluid to a trough disposed within an interior of the housing and configured to carry the working fluid to a bearing assembly associated with at least one of the input shaft and the primary output shaft when the clutch assembly is in the disengaged position.

According to another exemplary embodiment, a transfer case includes a housing; an input shaft extending through the housing; a primary output shaft extending through the housing; a secondary output shaft extending through the housing; a clutch assembly having an engaged position in which the primary output shaft is coupled to the secondary output shaft to transfer torque therebetween and a disengaged position in which the primary output shaft is not coupled to the secondary output shaft; and a pump. The pump is configured to selectively supply a working fluid to a fluid reservoir of an actuator. The actuator is configured to apply force to the clutch assembly to cause the clutch assembly to move between the disengaged position and the engaged position.

The transfer case also includes a relief valve having a relief valve inlet fluidly coupled to the fluid reservoir of the actuator and a relief valve outlet fluidly coupled to a trough disposed within an interior of the housing. The trough is configured to carry the working fluid to a bearing assembly associated with at least one of the input shaft and the primary output shaft when the clutch assembly is in the disengaged position. The relief valve inlet opens to receive the working fluid based on a threshold pressure level of the working fluid in the fluid reservoir. The transfer case also includes a disconnect valve having a disconnect valve inlet fluidly coupled to the relief valve outlet, a first disconnect valve outlet fluidly coupled to the trough, and a second disconnect valve outlet fluidly coupled to a sump supplying the working fluid to the pump. The working fluid is selectively supplied to the trough based on a first position of the disconnect valve and selectively supplied to the sump based on a second position of the disconnect valve.

BRIEF DESCRIPTION OF THE DRAWINGS

The description herein makes reference to the accompanying drawings, wherein like referenced numerals refer to like parts throughout several views, and wherein.

DETAILED DESCRIPTION

A lubrication system for a disconnect mode operation of a transfer case of a motor vehicle drivetrain includes a pump selectively supplying working fluid to an actuator of a clutch assembly, a relief valve fluidly coupled to a fluid reservoir for the actuator, and a trough fluidly coupled to an outlet of the relief valve. The trough can carry working fluid from the relief valve outlet across a housing of the transfer case to a bearing assembly associated with at least one of an input shaft and a primary output shaft of the transfer case. Use of this lubrication system allows greater operating efficiency of the transfer case, improving fuel economy.

Figure 1:
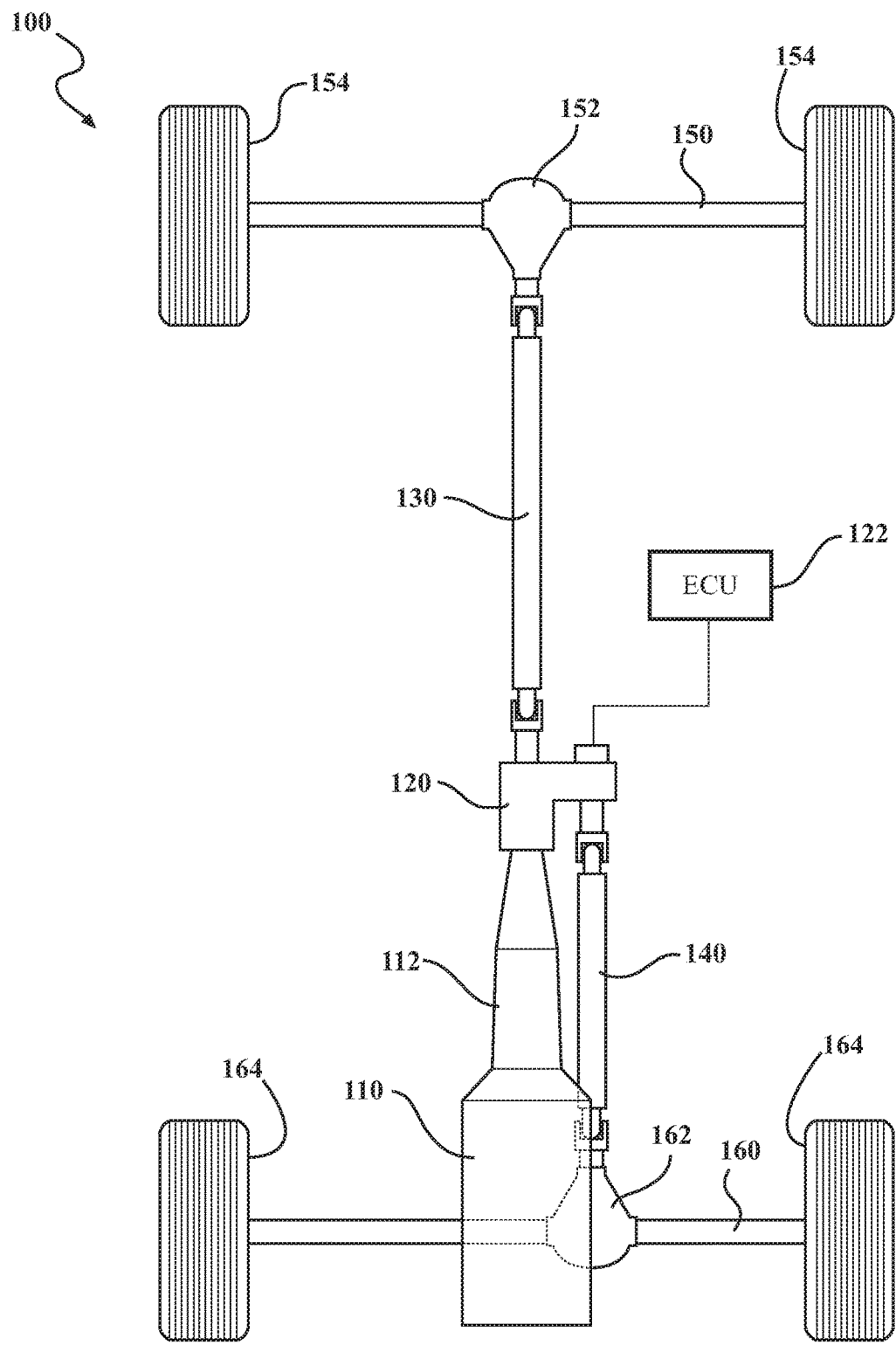
FIG. 1 is a plan view illustration showing a drivetrain that includes a transfer case.

FIG. 1 is a plan view illustration showing a drivetrain 100 for a four-wheel drive vehicle. The drivetrain 100 includes an engine 110 that is coupled to a transmission 112. The engine 110 is the prime mover of the drivetrain 100 and can be, for example, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 120. The transfer case 120 is operable to distribute driving power to a rear driveshaft 130 and a front driveshaft 140. The transfer case 120 can, in some implementations, include components that allow the transfer case 120 to perform a mode shift between two or more different operational modes. For example, the transfer case 120 can allow operation in a rear-wheel or two-wheel drive mode. In the two-wheel drive mode, also called the disconnect mode, only the rear driveshaft 130 receives driving power and the front driveshaft 140 does not. The transfer case 120 can also allow operation in a four-wheel drive mode. In the four-wheel drive mode, the rear driveshaft 130 and the front driveshaft 140 both receive driving power. In the above examples, the rear driveshaft 130 is the primary driveshaft, and the front driveshaft 140 is the secondary driveshaft.

In other implementations, the front driveshaft 140 can be the primary driveshaft, the rear driveshaft 130 can be the secondary driveshaft, and the transfer case 120 can perform a mode shift between a front-wheel or two-wheel drive mode and a four-wheel drive mode. In other implementations, the transfer case 120 does not include components that allow a mode shift, and the transfer case 120 constantly provides driving power to both the rear driveshaft 130 and the front driveshaft 140.

The transfer case 120 can allow a range shift that selectively provides gear reduction to the rotational output of the transfer case 120. For example, the transfer case 120 can include components for operating in a high range, such as a 1:1 drive ratio, or a low range, such as a 2:1 drive ratio. The range shift changes the transfer case 120 between operation in the low range and the high range by selectively coupling and uncoupling a gear reduction mechanism of the transfer case 120. Operation of the transfer case 120 can be regulated by a controller such as an electronic control unit (ECU) 122 that provides signals to components of the transfer case 120 to cause the mode shift and/or the range shift. In other implementations, the mode shift and/or the range shift can be actuated mechanically, such as by a driver-operated lever that is mechanically connected to a component of the transfer case 120.

The rear driveshaft 130 provides driving power to a rear axle 150 via a rear differential 152. The rear axle 150 can be, for example, a solid axle or a pair of independent half axles. The rear axle 150 provides driving power to a pair of rear wheels 154 that are fitted with tires. The front driveshaft 140 provides driving power to a front axle 160 via a front differential 162. The front axle 160 can also be, for example, a solid axle or a pair of independent half axles. The front axle 160 provides driving power to a pair of front wheels 164 that are fitted with tires.

Figure 2:
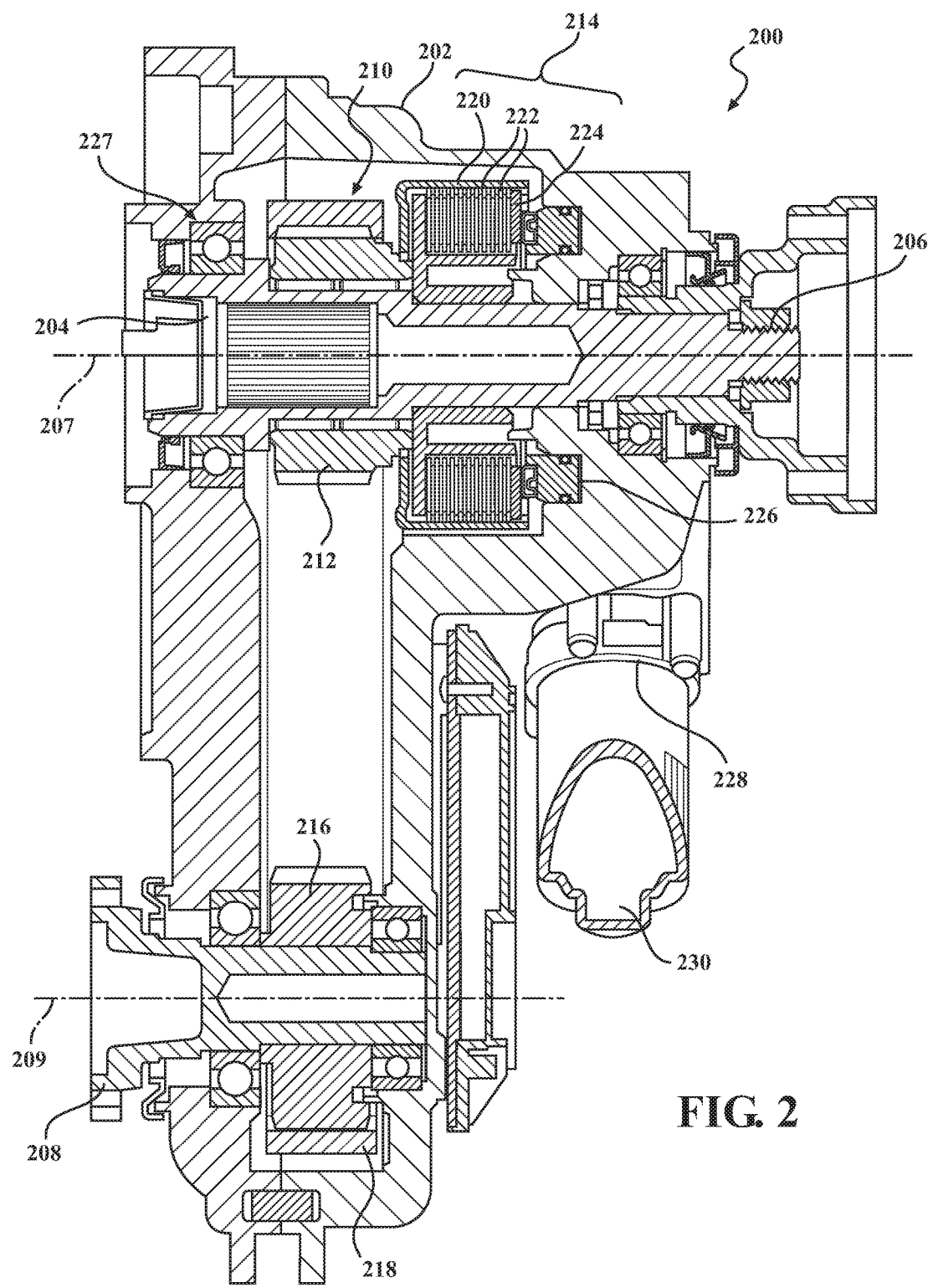
FIG. 2 is a cross-section illustration showing a transfer case.

FIG. 2 is a cross-section illustration showing a transfer case 200. The transfer case 200 includes a housing 202 and rotating components including an input shaft 204, a primary output shaft 206, and a secondary output shaft 208 that each extend through and out of the housing 202. The input shaft 204 and the primary output shaft 206 extend along a first axis 207. The secondary output shaft 208 extends along a second axis 209 which is, in this example, substantially parallel to the first axis 207. Together, the input shaft 204, the primary output shaft 206, and the secondary output shaft 208 form a power transfer assembly.

The transfer case 200 generally includes a torque transfer system 210 configured to selectively transfer torque between the primary output shaft 206 (e.g., the rear driveshaft 130) and the secondary output shaft 208 (e.g., the front driveshaft 140), the torque transfer system 210 being operable by a torque transfer actuation mechanism. The torque transfer system 210 includes a first sprocket 212 (e.g., rotating member) arranged on the primary output shaft 206 and connected to the primary output shaft 206 by a clutch assembly 214. A second sprocket 216 is arranged on the secondary output shaft 208 and is connected thereto for rotation in unison, such as by splines (not shown). The first sprocket 212 and the second sprocket 216 are connected by a chain 218, such that the secondary output shaft 208 is driven by the primary output shaft 206 via the first sprocket 212, the chain 218, and the second sprocket 216 when the clutch assembly 214 is in an engaged position.

The clutch assembly 214 generally includes a housing, or a drum 220, a plurality of interleaved plates 222, and a pressure or apply plate 224. The drum 220 generally includes a radial base through which the primary output shaft 206 extends, and a concentric or annular flange extending axially away from an outer periphery of the base to form the generally cylindrical drum 220 in which the interleaved plates 222 are positioned. The base of the drum 220 is coupled to the first sprocket 212 to cause rotation thereof, while the apply plate 224 is coupled to the primary output shaft 206 (e.g., through a splined connection) to rotate therewith. The interleaved plates 222 alternate between being engaged (e.g., splined) with the primary output shaft 206 and an inner periphery of the drum 220.

An actuator 226 is configured to apply force to the apply plate 224 of the clutch assembly 214 so as to compress the interleaved plates 222 between the apply plate 224 and the base of the drum 220 so as to increase friction therebetween and transfer torque between the interleaved plates 222 splined with primary output shaft 206 and the interleaved plates 222 splined with the drum 220. In this manner, the clutch assembly 214 is considered to be in an engaged position such that torque may be selectively transferred from the primary output shaft 206 to the first sprocket 212, and through the use of the chain 218, torque is transferred to the secondary output shaft 208.

In the example of FIG. 2, the actuator 226 can include a piston or other controlled mechanism that is actuated by means of working fluid supplied to a fluid reservoir (not shown) associated with the actuator 226 by a hydraulic pump 228 associated with a lubrication system for the transfer case 200. The hydraulic pump 228 can include a sump 230 that serves as a reservoir of working fluid, such as oil, hydraulic fluid, or other lubricating fluid used to provide lubricant to various components of the transfer case 200 such as the fluid reservoir of the actuator 226. The hydraulic pump 228 can be driven by an electric motor (not shown), such as a brush-based DC motor. The hydraulic pump 228 can be, for example, a gear pump, a vane pump, a radial piston pump, or an axial piston pump. Additional components of the lubrication system for the transfer case 200 are described below.

Motion, for example, of the chain 218, that occurs during torque transfer between the primary output shaft 206 and the secondary output shaft 208 can serve as a mechanism to disperse working fluid present within the housing 202 in a manner sufficient to lubricate a bearing assembly 227 associated with at least one of the input shaft 204 and the primary output shaft 206 when the clutch assembly 214 is in the engaged position. The bearing assembly 227 requires at least some lubrication to support rotational function of the input shaft 204 and/or the primary output shaft 206. In the transfer case 200 of FIG. 2, working fluid drips, sprays, or is generally expelled from links of the chain 218 as it rotates. However, in a disconnect mode of the transfer case 200, the clutch assembly 214 is in a disengaged position such that the primary output shaft 206 is not coupled to the secondary output shaft 208, and the chain 218 does not rotate with or travel between the primary output shaft 206 and the secondary output shaft 208, so other means of providing lubrication to the bearing assembly 227 are required.

Figure 3:
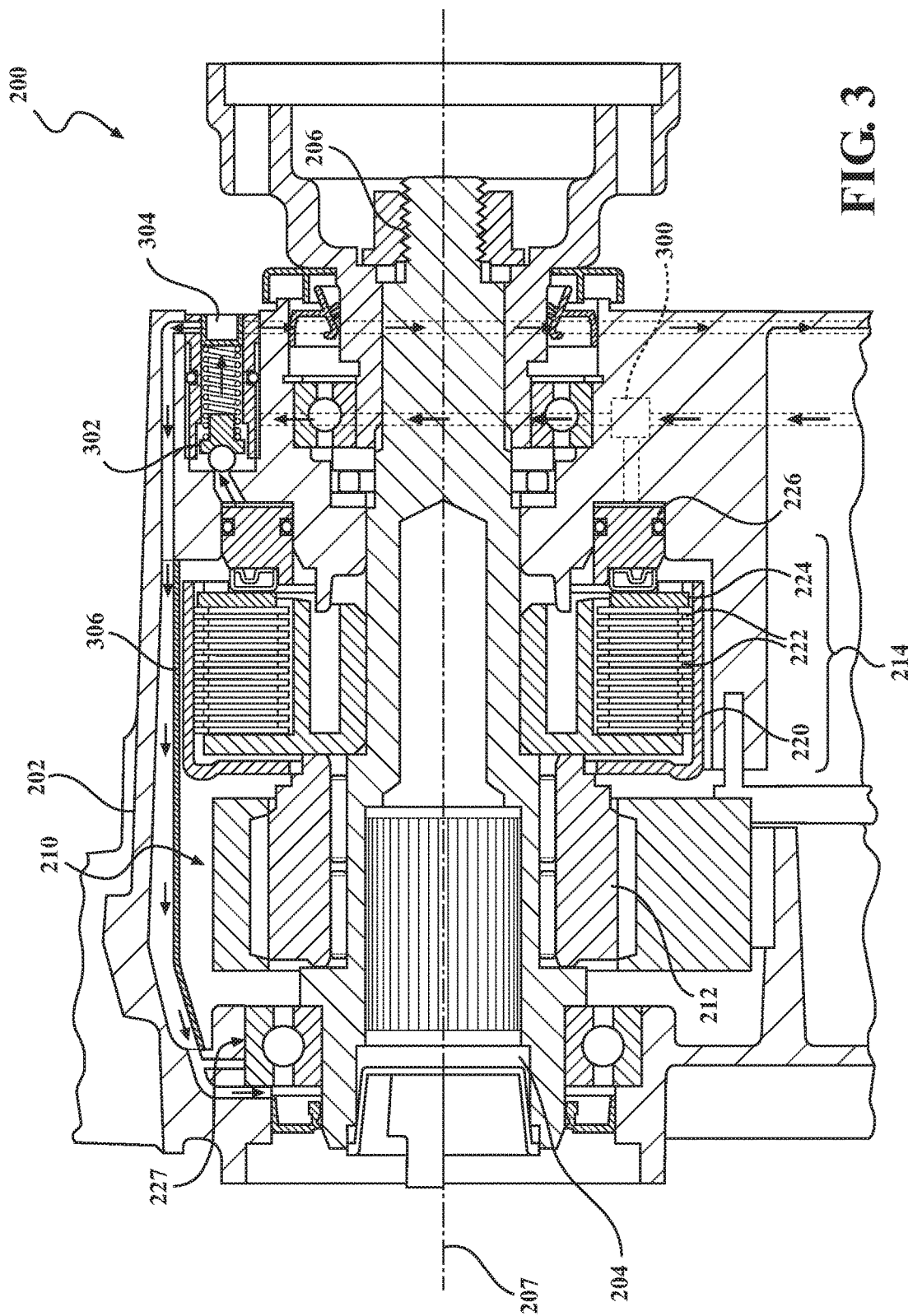
FIG. 3 is another cross-section illustration showing the transfer case of FIG. 2.

FIG. 3 is another cross-section illustration showing the transfer case 200 of FIG. 2. In this example, the location of the cross-section of FIG. 3 is rotationally spaced from the location of the cross-section of FIG. 2 in a position approximately 45° around the primary output shaft 206. This position of the cross-section in FIG. 3 is used to highlight the location of additional components in the lubrication system such as a clutch valve 300, a relief valve 302, a disconnect valve 304, and a trough 306, each of which are fluidly coupled to transmit the working fluid within the transfer case 200 to lubricate various components such as the bearing assembly 227, for example, when the clutch assembly 214 is in the disengaged position. Representative fluid paths within the housing 202 of the transfer case 200 are shown with arrows indicating direction of flow for the working fluid. Some of the fluid paths are indicated in solid line as visible within the cross-section of FIG. 3 and others are shown in dotted line to indicate an out-of-section position. The location of the fluid paths, either as shown or in other positions not shown, does not affect the operation of the lubrication system.

The clutch valve 300 can fluidly couple the hydraulic pump 228 of FIG. 2 (not shown in FIG. 3) and the fluid reservoir of the actuator 226. For example, the clutch valve 300 has an inlet fluidly coupled to the hydraulic pump 228 and a first position where a first outlet is fluidly coupled to the fluid reservoir of the actuator 226 such that working fluid can be selectively supplied to the actuator 226 in order to move components of the clutch assembly 214 between a disengaged position and an engaged position. In other words, when the clutch valve 300 is in the first position, working fluid from the hydraulic pump 228 is supplied to the fluid reservoir of the actuator 226.

The clutch valve 300 also has a second position where a second outlet is fluidly coupled to the disconnect valve 304 such that the hydraulic pump 228 can selectively supply working fluid directly to the disconnect valve 304 and bypass the actuator 226. That is, when the clutch valve 300 is in the second position, for example, in a disconnect mode, working fluid from the hydraulic pump 228 is supplied to the disconnect valve 304, and as further described below, to the bearing assembly 227. The clutch valve 300 is an optional bypass, as the lubrication system can also provide working fluid to the bearing assembly 227 through use of the fluid reservoir of the actuator 226, the relief valve 302, the disconnect valve 304, and the trough 306.

The relief valve 302 can be fluidly coupled to the fluid reservoir of the actuator 226. The relief valve 302 has several functions. For example, the relief valve 302 can remove air from the clutch assembly 214 during the assembly process, control maximum pressure in the clutch assembly 214, and provide a calibration means for the clutch assembly 214 during its lifetime. The relief valve 302 has an inlet that opens to receive the working fluid from the fluid reservoir of the actuator 226 and allows leakage or a burp of working fluid when a threshold pressure level is reached in the fluid reservoir. Given the pressure relief function, the relief valve 302 allows the electric motor of the hydraulic pump 228 to run constantly (e.g. brushes will not burn in a non-running DC motor). By running constantly, the electric motor of the hydraulic pump 228 maintains a short reaction time to build up pressure, and, thus, less energy will be spent to accelerate rotating parts.

Instead of returning the working fluid exiting the relief valve 302 to the sump 230 of the hydraulic pump 228, the trough 306 can be fluidly coupled to an outlet of the relief valve 302. The trough 306 can be designed to carry the working fluid from the outlet of the relief valve 302 to the bearing assembly 227 associated with the input shaft 204 and/or the primary output shaft 206 to provide lubrication to the bearing assembly 227 when the clutch assembly 214 is in the disengaged position. In the example of FIG. 3, the trough 306 is located within an interior of the housing 202 above the torque transfer system 210. In this example, the working fluid moves across the trough 306 to drip or drop on the bearing assembly 227 under the pull of gravitational force.

The trough 306 can be formed as a tube, a partial-tube, a plate, or any other physical mechanism sufficient to carry working fluid from the outlet of the relief valve 302 to a location sufficient to lubricate the bearing assembly 227. The trough 306 can be clipped, snapped, threaded, tabbed, screwed, or otherwise wedged into place to maintain its required position within the housing 202. Alternatively, the trough 306 can be bored or otherwise directly formed within the walls of the housing 202 as a conduit. When the trough 306 is a separate piece installed into the housing 202, the material used to construct the trough 306, such as aluminum, steel, nylon, or some polymers, can be sufficient to sustain high temperatures (e.g., 140° C.) present within the housing 202.

The disconnect valve 304 has an inlet fluidly coupled to the outlet of the relief valve 302 and a first position wherein a first outlet is fluidly coupled to the trough 306 such that the working fluid is selectively supplied to the trough 306. The disconnect valve 304 has a second position where a second outlet is fluidly coupled to the sump 230 of the hydraulic pump 228 such that the working fluid released by the relief valve 302 is selectively returned to the hydraulic pump 228. The various flow paths for the working fluid as controlled by the clutch valve 300, the relief valve 302, and the disconnect valve 304 are further described in reference to FIG. 4.

Figure 4:
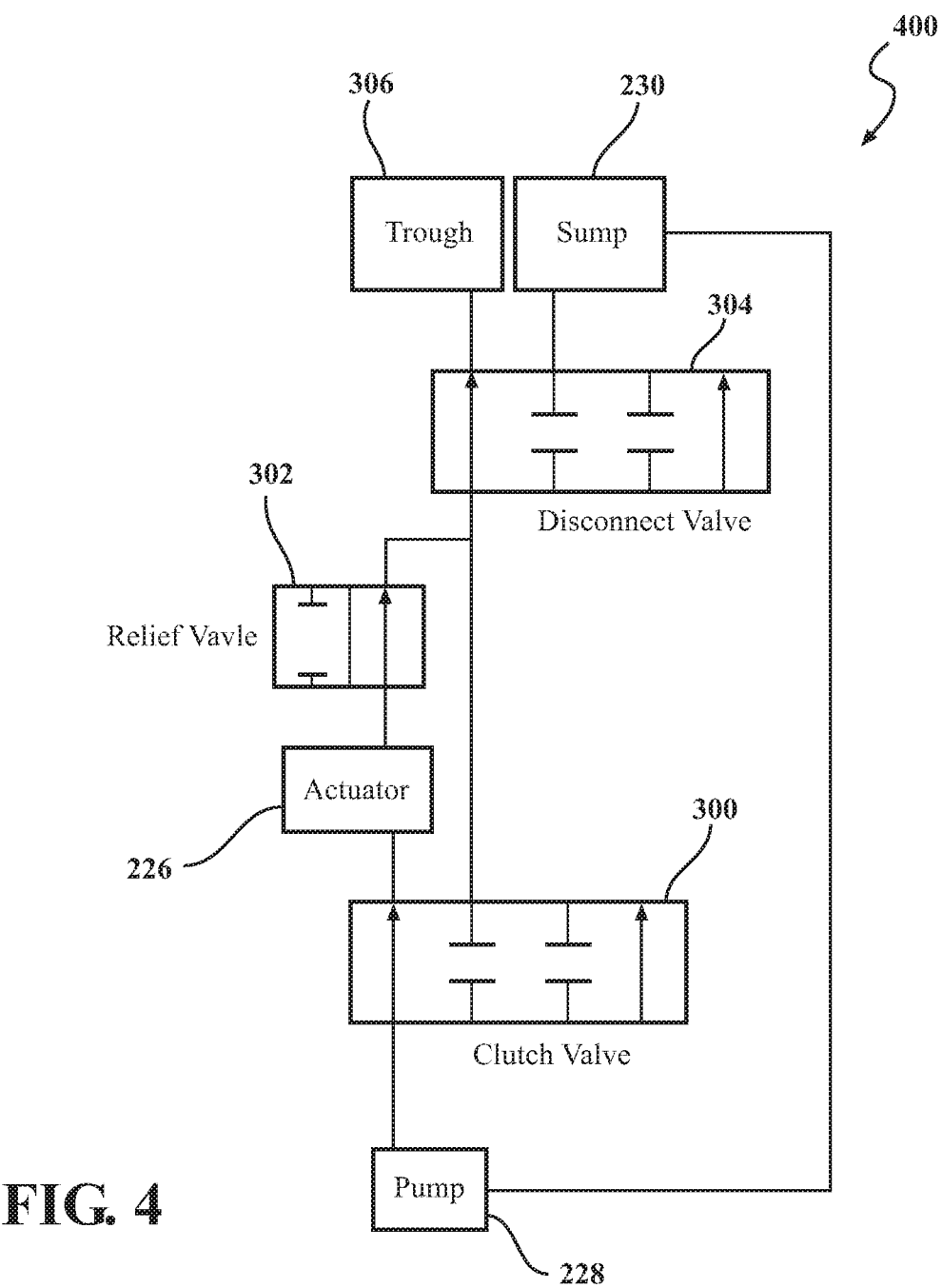
FIG. 4 is a hydraulic schematic showing a lubrication system for use with the transfer case of FIGS. 2 and 3.

FIG. 4 is a hydraulic schematic showing a lubrication system 400 for use with the transfer case 200 of FIGS. 2 and 3. Movement of working fluid through the lubrication system 400 is described in reference to the positions of the clutch valve 300, the relief valve 302, and the disconnect valve 304. Starting with the hydraulic pump 228, working fluid can enter the inlet of the clutch valve 300 and either exit through a first outlet to the fluid reservoir of the actuator 226 as shown or exit through a second outlet directly to the inlet of the disconnect valve 304, bypassing the clutch assembly 214 as described above. Use of the clutch valve 300 is optional, as the lubrication system 400 can provide working fluid to the trough 306 without the use of the clutch valve 300. However, use of the clutch valve 300 to bypass the actuator 226 and the relief valve 302 may allow for more direct control of supply of the working fluid to the trough 306.

Moving to the actuator 226, working fluid from the fluid reservoir of the actuator 226 enters an inlet of the relief valve 302 once a threshold pressure level is met within the fluid reservoir. When the clutch assembly 214 has a disengaged position, for example, in the disconnect mode, the hydraulic pump 228 can be controlled to send sufficient amounts of working fluid to the reservoir to overcome the threshold pressure level to open the inlet of the relief valve 302 at a desired interval. The relief valve 302 has only one outlet, so working fluid entering the inlet is burped or leaked through the outlet. At this juncture, working fluid from the second outlet of the clutch valve 300, if present, can join working fluid from the outlet of the relief valve 302 in entering an inlet of the disconnect valve 304.

Working fluid entering the inlet of the disconnect valve 304 can either exit through a first outlet to the trough 306 to provide lubrication for components such as the bearing assembly 227 as shown in FIG. 3 or can exit through a second outlet to the sump 230 of the hydraulic pump 228. The disconnect valve 304 can be controlled to send the working fluid to the trough 306, for example, in association with that disconnect mode, that is, when the clutch assembly 214 has a disengaged position. The disconnect valve 304 can also be controlled to send the working fluid to the trough 306, for example, when one or more sensors indicate that a temperature of the bearing assembly 227 is above a threshold value. The disconnect valve 304 can be controlled to send the working fluid to the sump 230, for example, when the clutch assembly 214 has an engaged position, recycling any burped working fluid exiting the relief valve 302.

In an alternative example (not shown), the disconnect valve 304 can be removed from the lubrication system 400 such that working fluid moves directly from the outlet of the relief valve 302 to the trough 306. In this example, none of the working fluid exiting the relief valve 302 would be returned to the sump 230, though the housing 202 of the transfer case 200 can include its own sump (not shown) to receive any working fluid dripping or dropping from the bearing assembly 227. The various positions of the clutch valve 300 and the disconnect valve 304 can be regulated by a controller such as the ECU 122 described in respect to FIG. 1. By using the lubrication system 400 described in FIGS. 3 and 4, the benefits of better fuel economy achievable by disconnecting the secondary output shaft 208 can be realized without impacting the lubrication requirements of the input shaft 204 and/or the primary output shaft 206.

While the disclosure has been made in connection with what is presently considered to be the most practical and preferred embodiment, it should be understood that the disclosure is intended to cover various modifications and equivalent arrangements.

The invention claimed is:

1. A lubrication system for a transfer case, comprising:
a pump configured to selectively supply a working fluid to a fluid reservoir of an actuator configured to apply force to a clutch assembly to cause the clutch assembly to move between a disengaged position and an engaged position;
a relief valve having a relief valve inlet fluidly coupled to the fluid reservoir of the actuator, wherein the relief valve inlet opens to receive the working fluid based on a threshold pressure level of the working fluid in the fluid reservoir; and
a trough fluidly coupled to a relief valve outlet of the relief valve and configured to carry the working fluid from the relief valve outlet to a bearing assembly associated with at least one of an input shaft and a primary output shaft of the transfer case when the clutch assembly is in the disengaged position,
wherein the trough includes a conduit configured and dimensioned to transport the working fluid from the relief valve to the bearing assembly.

2. The lubrication system of claim 1, wherein motion associated with a torque transfer between the primary output shaft and a secondary output shaft of the transfer case disperses the working fluid in a manner sufficient to lubricate the bearing assembly when the clutch assembly is in the engaged position.

3. The lubrication system of claim 1, further comprising:
a disconnect valve having a disconnect valve inlet fluidly coupled to the relief valve outlet and a first disconnect valve outlet fluidly coupled to the trough, wherein the working fluid is selectively supplied to the trough based on a first position of the disconnect valve.

4. The lubrication system of claim 3, wherein the disconnect valve has a second disconnect valve outlet fluidly coupled to a sump supplying the working fluid to the pump, and wherein the working fluid is selectively supplied to the sump based on a second position of the disconnect valve.

5. The lubrication system of claim 3, further comprising:
a clutch valve having a clutch valve inlet fluidly coupled to the pump and a first clutch valve outlet fluidly coupled to the fluid reservoir of the actuator, wherein the working fluid is selectively supplied to the actuator based on a first position of the clutch valve.

6. The lubrication system of claim 5, wherein the clutch valve has a second clutch valve outlet fluidly coupled to the disconnect valve, and wherein the working fluid is selectively supplied to the disconnect valve based on a second position of the clutch valve.

7. The lubrication system of claim 1, wherein the bearing assembly is located remotely from the relief valve.

8. The lubrication system of claim 7, wherein the relief valve is located proximate to a first end of the housing and the bearing assembly is located proximate to a second end of the housing.

9. A transfer case, comprising:
a housing;
an input shaft extending through the housing;
a primary output shaft extending through the housing;
a secondary output shaft extending through the housing;
a clutch assembly having an engaged position in which the primary output shaft is coupled to the secondary output shaft to transfer torque therebetween and a disengaged position in which the primary output shaft is not coupled to the secondary output shaft; and
a pump configured to:
selectively supply a working fluid to a fluid reservoir of an actuator configured to apply force to the clutch assembly to cause the clutch assembly to move between the disengaged position and the engaged position; and
selectively supply the working fluid to a trough disposed within an interior of the housing and configured to carry the working fluid to a bearing assembly associated with at least one of the input shaft and the primary output shaft when the clutch assembly is in the disengaged position, wherein the trough includes a conduit configured and dimensioned to transport the working fluid to the bearing assembly.

10. The transfer case of claim 9, wherein motion associated with the torque transfer between the primary output shaft and the secondary output shaft disperses the working fluid in a manner sufficient to lubricate the bearing assembly when the clutch assembly is in the engaged position.

11. The transfer case of claim 9, further comprising:
a relief valve having a relief valve inlet fluidly coupled to the fluid reservoir of the actuator, wherein the relief valve inlet opens to receive the working fluid based on a threshold pressure level of the working fluid in the fluid reservoir.

12. The transfer case of claim 11, wherein the relief valve has a relief valve outlet fluidly coupled to the trough.

13. The transfer case of claim 12, further comprising:
a disconnect valve having a disconnect valve inlet fluidly coupled to the relief valve outlet and a first disconnect valve outlet fluidly coupled to the trough, wherein the working fluid is selectively supplied to the trough based on a first position of the disconnect valve.

14. The transfer case of claim 13, wherein the disconnect valve has a second disconnect valve outlet fluidly coupled to a sump supplying the working fluid to the pump, and wherein the working fluid is selectively supplied to the sump based on a second position of the disconnect valve.

15. The transfer case of claim 13, further comprising:
a clutch valve having a clutch valve inlet fluidly coupled to the pump and a first clutch valve outlet fluidly coupled to the fluid reservoir of the actuator, wherein the working fluid is selectively supplied to the actuator based on a first position of the clutch valve.

16. The transfer case of claim 15, wherein the clutch valve has a second clutch valve outlet fluidly coupled to the disconnect valve, and wherein the working fluid is selectively supplied to the disconnect valve based on a second position of the clutch valve.

17. A transfer case, comprising:
a housing;
an input shaft extending through the housing;
a primary output shaft extending through the housing;
a secondary output shaft extending through the housing;
a clutch assembly having an engaged position in which the primary output shaft is coupled to the secondary output shaft to transfer torque therebetween and a disengaged position in which the primary output shaft is not coupled to the secondary output shaft;
a pump configured to selectively supply a working fluid to a fluid reservoir of an actuator configured to apply force to the clutch assembly to cause the clutch assembly to move between the disengaged position and the engaged position;
a relief valve having a relief valve inlet fluidly coupled to the fluid reservoir of the actuator and a relief valve outlet fluidly coupled to a trough disposed within an interior of the housing and configured to carry the working fluid to a bearing assembly associated with at least one of the input shaft and the primary output shaft when the clutch assembly is in the disengaged position, wherein the relief valve inlet opens to receive the working fluid based on a threshold pressure level of the working fluid in the fluid reservoir; and
a disconnect valve having a disconnect valve inlet fluidly coupled to the relief valve outlet, a first disconnect valve outlet fluidly coupled to the trough, and a second disconnect valve outlet fluidly coupled to a sump supplying the working fluid to the pump, wherein the working fluid is selectively supplied to the trough based on a first position of the disconnect valve, and wherein the working fluid is selectively supplied to the sump based on a second position of the disconnect valve,
wherein the trough includes a conduit configured and dimensioned to transport the working fluid from the relief valve to the bearing assembly.

* * * * *